July 9, 1935.  A. C. LIPPERT ET AL  2,007,805
SELF LOCKING CAP FOR GAS TANKS AND THE LIKE
Filed June 30, 1932  2 Sheets-Sheet 1
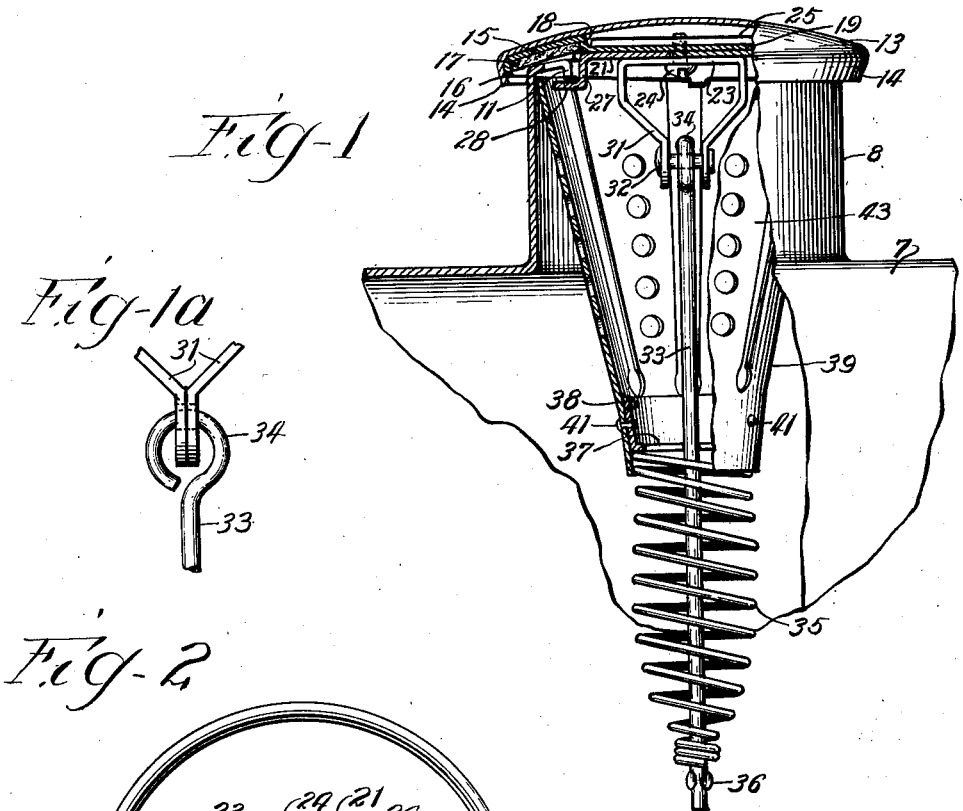
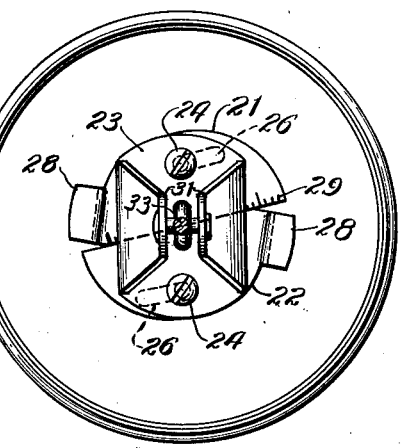
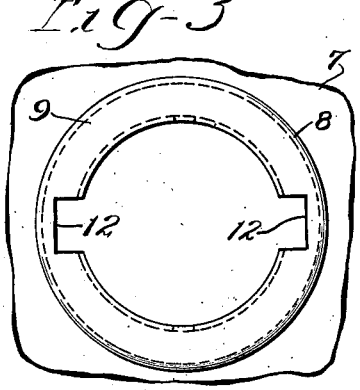
Inventors:
Aloysius C. Lippert &
John D. Cramer:
By Carl S. Lloyd
Atty.

July 9, 1935.  A. C. LIPPERT ET AL  2,007,805
SELF LOCKING CAP FOR GAS TANKS AND THE LIKE
Filed June 30, 1932  2 Sheets-Sheet 2
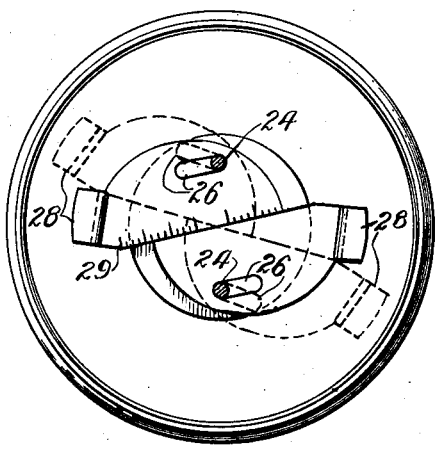
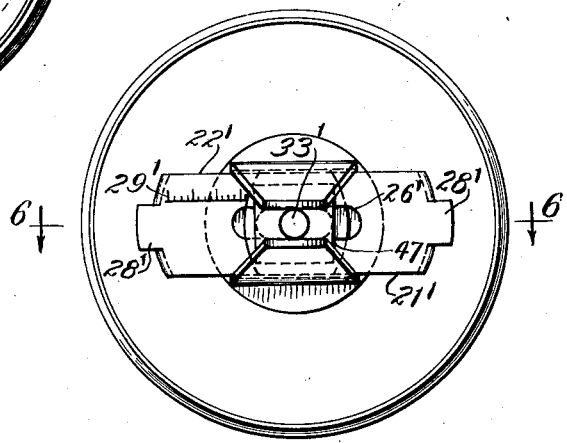
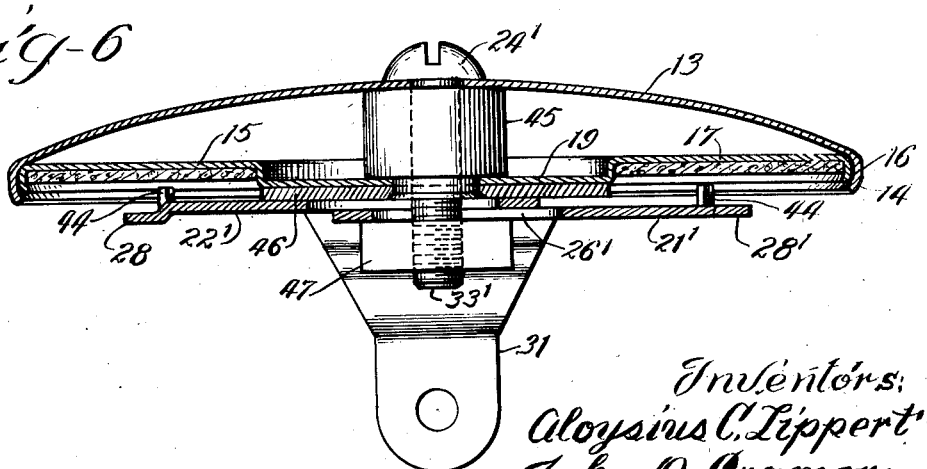
Inventors:
Aloysius C. Lippert &
John D. Cramer;
By: Carl S. Lloyd
Atty.

UNITED STATES PATENT OFFICE 2,007,805

SELF-LOCKING CAP FOR GAS TANKS AND THE LIKE

Aloysius C. Lippert, Kenosha, Wis., and John D. Cramer, Chicago, Ill., assignors to The Norlipp Company, Chicago, Ill., a corporation of Illinois Application June 30, 1932, Serial No. 620,134

9 Claims. (Cl. 220—40)

This invention relates to self-locking caps for gas tanks and the like adapted particularly to prevent theft of gasoline from the gas tanks of automobiles.

The primary object of the invention is to provide a gas tank cap of this character so constructed that it may be tightened onto the filler neck of the gas tank to prevent leakage, and being provided with adjustable elements whereby a cap of one size may be made to fit all standard makes of automobile gas tanks, regardless of varying sizes of the latter.

Other objects and advantages of the invention will be apparent from the following detailed description, which, taken in connection with the accompanying drawings, discloses a preferred embodiment thereof.

Referring to the drawings:

Fig. 1 is a view, partly in section and partly in elevation, of a gas tank cap embodying our invention applied to the filler neck of a standard automobile gas tank;

Fig. 1a is a detail view of one form of attaching means for the anchoring rod of the cap;

Fig. 2 is a bottom plan view of the cover forming a part of the locking cap assembly, showing a preferred form of the adjusting means for adapting the cap to filler necks of different sizes;

Fig. 3 is a top plan view of a standard gas tank filler neck;

Fig. 4 is another bottom plan view of the cover, showing the adjusting means in two additional positions, one position being shown in full lines, and the other in dash lines;

Fig. 5 is a bottom plan view of the cover showing a modification of the adjusting means; and Fig. 6 is a vertical sectional view taken substantially on line 6—6 of Fig. 5.

On said drawings we have shown, for illustrative purposes only, a gas tank 7 having a filler neck 8 which is turned inwardly at the top to provide a horizontal rim portion 9 having a depending flange 11, said rim 9 and flange 11 being cut away at opposite sides to provide notches 12 for a purpose which will be presently described.

Our cap comprises a cover 13 having a depending inwardly-turned flange 14, an inner plate 15 being provided in the cover, the outer part of said plate, as shown in Fig. 1, conforming to the under side of the cover and having a depending flange 16 held within the flange 14 of the cover, which latter, it will be understood, may be turned inwardly after the inner plate and the parts carried thereby have been positioned. A circular gasket 17 is positioned on the under side of said outer part of the plate 15 and is adapted to engage the rim 9 of the filler neck. Said plate 15 is recessed centrally on the top thereof, as indicated at 18, providing a horizontal central portion 19, to the under side of which adjustable retaining members 21 and 22 and a bracket 23 are secured by means of screws 24 which extend upwardly through said bracket, the adjustable retaining members 21 and 22, respectively, the plate portion 19 and a plate 25, the latter having threaded holes thereinto receive said screws, thereby serving as a nut between which and the heads of the screws the intermediate elements above described may be clamped.

The adjustable retaining elements 21 and 22 are provided with slots 26 through which said screws extend and are turned downwardly near their outer ends, as indicated at 27, and thence outwardly, to provide horizontal lips 28 adapted to pass through the notches 12 when the cap is applied and to thereafter engage the lower edge of the flange 11 on the filler neck when said cover is rotated on the neck after being applied thereto. Said flange 11 is in the form of a cam, so that upon turning the cap it will be tightened on the filler neck to tightly clamp the gasket 17 against the rim 9 for the purpose of preventing leakage of gasoline through jolts and jars to the car in travelling over rough roads.

As shown in Figs. 2 and 4, the adjustable retaining elements 21 and 22 are slidable with respect to each other (this being permitted by the slots 26 through which the screws 24 extend), whereby the lips 28 are extensible from the position shown in Fig. 2 to the position shown in full lines in Fig. 4 and thereafter, if desired, to the position shown in dotted lines in said figure, the movement from the full line to the dotted line position in Fig. 4 being permitted by a pivotal action of said retaining members on the screws 24, as will be apparent from inspection of said figure. Obviously said members may be located in any intermediate position and when the screws 24 are tightened will be firmly held in the adjusted position, exact adjustment being facilitated by means of graduations 29 on one or both of said retaining members, as shown in Figs. 2 and 4. It is thus possible to locate the lips 28 at any desired distance apart within the range from the position shown in Fig. 2 to the dash line position shown in Fig. 4, this range being such as to make it possible to adjust said members to all, or substantially all, standard filler necks.

The bracket 23 is provided with downwardly extending converging arms 31, the lower ends of which are apertured to receive a rivet 32, on which a rod 33 is pivoted by means of a hook 34 at the upper end thereof. If desired, the lower ends of the arms 31 may be located adjacent one another, as shown in Fig. 1a, and the hook 34 on said rod 33 positioned in the aligned apertures in said arms, thereby dispensing with the necessity of using the rivet 32. Said rod 33 carries at its lower end a helical spring 35 held between wings 36 on the lower end of said rod and a horizontal flange 37 formed on the lower edge of a ring 38, to which an expansible spring sleeve 39 is secured by means of rivets 41, as shown in Fig. 1. Said sleeve flares outwardly toward the top and is slotted, as indicated at 42, to provide a series of flat spring leaves 43, the upper ends of which are adapted to expand outwardly to engage beneath the rim 9 on the filler neck when the cap is applied, the ends of said spring leaves being rendered inaccessible by means of the downwardly extending flange 11 on said filler neck.

The lower end of the spring sleeve 39 extends below the flange 37 on the ring 38, thereby providing a cage for retaining the upper end of the helical spring 35. Said spring 35 thus tends to draw the cover 13 downwardly against the filler neck and the spring sleeve 39 locks the cap in place so that it can not be removed without considerable difficulty and special tools, it being evident also that the tapered form of said sleeve, together with the form of the spring 35 which tapers to a point of attachment with the rod 33 at the lower end thereof, prevents the insertion of a siphon tube in the filler tank, thereby preventing theft of gasoline from the automobile when parked, which has become a common form of theft.

Referring now to Figs. 5 and 6, we have shown a somewhat modified form of adjusting mechanism comprising two sliding plates 21¹ and 22¹, the one being superimposed upon the other, said plates being centrally slotted, as indicated at 26¹, and having lips 28¹ at their outer ends for engaging in the filler neck in the manner previously described. Said plates have, or may have, stop lugs 44 on the upper side thereof which are adapted to engage the flange 11 of the filler neck 8 to hold the cap in central position thereon, said plates being adapted to be held in adjusted position by means of a screw 24¹ extending through the cover 13, a collar 45, the central portion 19 of the plate 15, and through an intermediate plate 46, a nut 47 being provided on the inner end of said screw beneath the plates 21¹ and 22¹, said nut being confined between the arms 31 of the bracket 23 to prevent turning thereof. The plate 22¹ may be provided with graduations, as shown in Fig. 5, whereby accurate positioning of said plate may be effected prior to the tightening of the screw 24¹. With this construction only one screw need be provided at the center of the cap, passing through the registering slots 26¹ of the plates 21¹ and 22¹, so that both said plates may be clamped in fixed position by the tightening of said screw. Other specific adjusting means might be employed within the purport of the invention, the two forms shown, while having particular advantages, being evidently capable of certain modifications without departing from the scope of the invention.

Heretofore, when self-locking gas tank caps have been provided with means for tightening the cap onto the filler neck to prevent leakage, it has been the practice to provide a different size cap for each size of filler neck. Inasmuch as the sizes of such necks vary considerably on different cars, this has required that the dealer carry in stock a number of different sizes which is, of course, uneconomical. However, no escape from this practice was found prior to our invention. In accordance with the invention, the means for holding the cap tightly on the filler neck may be adjusted, as previously described, to all, or substantially all, standard filler necks, and it thus is made possible for a cap of one size to be adapted to practically all cars, thus effecting a decided economy both from the standpoint of the dealer and that of the manufacturer.

For the purpose of filling the tank the cover 13 may be tilted to one side by lifting the same against the tension of the spring 35, thus permitting the insertion of the nozzle of a filler hose into the filler neck, it being understood that before lifting the cap it will be turned to position the lips 28 in alignment with the notches 12 in the rim 9 of the filler neck. After the nozzle is withdrawn the cover will be drawn downwardly onto the filler neck by the tension of the spring 35, the lips 28 during this action being guided through the slots 12, the attendant then turning the cover to direct said lips under the flange 11 on the filler neck, thus clamping the cover in non-leaking position.

The foregoing detailed description has been given for clearness of understanding only, and no unnecessary limitations should be implied therefrom, but the appended claims should be construed as broadly as permissible in view of the prior art.

What we regard as new and desire to secure by Letters Patent is:

1. A cap for automobile gasoline tanks and the like comprising a cover member attachable to the filler neck of the tank, and means for clamping said cover member tightly against said filler neck to prevent leakage, said means including a slidable plate having a lip thereon adapted to engage a flange on the filler neck, and means for clamping said plate in various adjusted positions whereby to adapt the cap to filler necks of different sizes.

2. A cap for automobile gasoline tanks and the like comprising a cover member attachable to the filler neck of the tank, and means for clamping said cover member tightly against said filler neck to prevent leakage, said means including a plate having sliding and pivotal action and having a lip thereon adapted to engage a flange on the filler neck, and means for clamping said plate in various adjusted positions whereby to adapt the cap to filler necks of different sizes.

3. A cap for automobile gasoline tanks and the like comprising a cover member attachable to the filler neck of the tank, and means for clamping said cover member tightly against said filler neck to prevent leakage, said means comprising cam elements adapted to engage a flange on the filler neck, and means for clamping said cam elements in various adjusted positions whereby to adapt the cap to filler necks of different sizes.

4. A cap for automobile gasoline tanks and the like comprising a cover member attachable to the filler neck of the tank, and means for clamping said cover member tightly against said filler neck to prevent leakage, said means comprising a pair of slidable plates extensible in opposite directions and each having a lip thereon adapted to engage beneath the flange of the filler neck and to clamp said cover upon said neck upon rotary movement of the cover, and means for securing said plates in various adjusted positions whereby the cap may be adapted to filler necks of different sizes.

5. A cap for automobile gasoline tanks and the like comprising a cover member attachable to the filler neck of the tank, and means for clamping said cover member tightly against said filler neck to prevent leakage, said means comprising a pair of separately mounted slidable plates positioned adjacent each other and being extensible in opposite directions and each having a lip thereon adapted to engage beneath the flange of the filler neck and to clamp said cover upon said neck upon rotary movement of the cover, and means for securing said plates in various adjusted positions whereby the cap may be adapted to filler necks of different sizes.

6. A closure for a tube provided with securing means of the bayonet joint type, said closure comprising a cover member attachable to the tube, locking means on the cover member for cooperation with the securing means on the tube, said locking means being adjustable to different positions to adapt the closure to tubes of different sizes, and means for securing the locking means in adjusted position.

7. A closure for a tube provided with securing means of the bayonet joint type, said closure comprising a cover member attachable to the tube, locking means on the cover member for cooperation with the securing means on the tube, said locking means being adjustable to different positions to adapt the closure to tubes of different sizes, means for securing the locking means in adjusted position and a centering lug carried by said locking means and adapted to engage the interior of the tube to hold the closure in central position thereon.

8. A closure for a tube provided with securing means of the bayonet joint type, said closure comprising a cover member attachable to the tube, locking means on the cover member for engaging the tube, said locking means being adjustable to different positions to adapt the closure to tubes of different sizes, means for securing the locking means in adjusted position and a centering means associated with said locking means for maintaining the cover member in a central position on said tube.

9. A closure for filling tubes of gasoline tanks and the like, comprising a cover member attachable to said tube, bayonet locking means on the cover member for engaging the tube, said locking means being radially adjustable to different fixed positions to adapt the closure to tubes of different sizes.

ALOYSIUS C. LIPPERT.
JOHN D. CRAMER.